(12) United States Patent
Reznik et al.

(10) Patent No.: US 8,843,743 B2
(45) Date of Patent: Sep. 23, 2014

(54) METHOD AND SYSTEM FOR SECURING WIRELESS COMMUNICATIONS

(75) Inventors: Alexander Reznik, Titusville, NJ (US); Alan Gerald Carlton, Mineola, NY (US); Alain Charles Louis Briancon, Poolesville, MD (US); Yogendra Shah, Exton, PA (US); Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 489 days.

(21) Appl. No.: 12/649,151

(22) Filed: Dec. 29, 2009

(65) Prior Publication Data
US 2010/0318796 A1 Dec. 16, 2010

Related U.S. Application Data

(62) Division of application No. 11/283,017, filed on Nov. 18, 2005, now abandoned.

(60) Provisional application No. 60/684,257, filed on May 25, 2005, provisional application No. 60/661,856, filed on Mar. 15, 2005, provisional application No. 60/630,730, filed on Nov. 23, 2004.

(51) Int. Cl.
*H04L 29/06* (2006.01)

(52) U.S. Cl.
USPC ........................................................ 713/168

(58) Field of Classification Search
USPC ........................................................ 713/168
See application file for complete search history.

(56) References Cited

U.S. PATENT DOCUMENTS

| | | | |
|---|---|---|---|
| 5,134,633 | A | 7/1992 | Werner |
| 5,438,591 | A | 8/1995 | Oie et al. |
| 5,819,000 | A | 10/1998 | Oshima |
| 6,160,855 | A | 12/2000 | Nakamura et al. |
| 6,351,498 | B1 | 2/2002 | Yamao et al. |
| 6,381,261 | B1 | 4/2002 | Nagazumi |
| 6,580,762 | B1 | 6/2003 | Tsumura |
| 7,043,210 | B2 | 5/2006 | Zhu et al. |
| 7,073,116 | B1 | 7/2006 | Settle et al. |
| 7,369,621 | B2 | 5/2008 | Yoshii et al. |

(Continued)

FOREIGN PATENT DOCUMENTS

| | | |
|---|---|---|
| EP | 0 346 036 | 12/1989 |
| EP | 0 817 401 | 1/1998 |

(Continued)

OTHER PUBLICATIONS

A New Hierarchical Trusted Model for Wireless Sensor Networks Mingdi Xu ; Ruiying Du ; Huanguo Zhang Computational Intelligence and Security, 2006 International Conference on Publication Year: 2006 , pp. 1541-1544.*

(Continued)

*Primary Examiner* — Harris Wang
(74) *Attorney, Agent, or Firm* — Volpe and Koenig, P.C.

(57) ABSTRACT

A method for transmitting an encrypted signal to a wireless transmit/receive unit (WTRU) such that decryption of the encrypted signal depends on a trust zone associated with the WTRU is disclosed. The encryption may be performed using hierarchical modulation, scrambling, authentication, location validation, or a combination thereof. The size of a trust zone may also be adjusted.

20 Claims, 7 Drawing Sheets

(56) References Cited

U.S. PATENT DOCUMENTS

| | | |
|---|---|---|
| 7,471,640 B2 | 12/2008 | Huang et al. |
| 7,680,278 B2 * | 3/2010 | Hassan et al. .................. 380/210 |
| 2002/0150065 A1 | 10/2002 | Ponnekanti |
| 2003/0099362 A1 | 5/2003 | Rollins |
| 2003/0103554 A1 * | 6/2003 | Li et al. .......................... 375/141 |
| 2003/0233543 A1 | 12/2003 | Nagaratnam et al. |
| 2004/0066844 A1 | 4/2004 | Moon et al. |
| 2004/0095902 A1 | 5/2004 | Laroia et al. |
| 2004/0103275 A1 | 5/2004 | Ji et al. |
| 2004/0114692 A1 | 6/2004 | Matsumoto |
| 2004/0150510 A1 | 8/2004 | Taki et al. |
| 2004/0166901 A1 | 8/2004 | Umesh et al. |
| 2004/0203748 A1 * | 10/2004 | Kappes et al. ............... 455/432.1 |
| 2004/0236939 A1 | 11/2004 | Watanabe et al. |
| 2005/0141627 A1 | 6/2005 | Walker et al. |
| 2005/0164740 A1 | 7/2005 | Yoshii et al. |
| 2008/0170640 A1 | 7/2008 | Gao et al. |
| 2008/0298505 A1 | 12/2008 | Chen et al. |

FOREIGN PATENT DOCUMENTS

| | | |
|---|---|---|
| TW | 465199 | 11/2001 |
| TW | 480464 | 3/2002 |
| TW | 536892 | 6/2003 |
| TW | 569562 | 1/2004 |
| WO | 01/22767 | 3/2001 |
| WO | 03/094520 | 11/2003 |
| WO | 2004/004278 | 1/2004 |
| WO | 2004/054137 | 6/2004 |

OTHER PUBLICATIONS

Ma, Bin. "A novel stereoscopic security architecture with Trust Management for wireless sensor networks." Communication Software and Networks, 2009. ICCSN'09. International Conference on. IEEE, 2009.*

* cited by examiner

METHOD AND SYSTEM FOR SECURING WIRELESS COMMUNICATIONS

CROSS REFERENCE TO RELATED APPLICATIONS

This application is a divisional of U.S. patent application Ser. No. 11/283,017 filed Nov. 18, 2005, which claims priority from U.S. Provisional Application No. 60/630,730 filed Nov. 23, 2004, U.S. Provisional Application No. 60/661,856 filed Mar. 15, 2005, and U.S. Provisional Application No. 60/684,257 filed May 25, 2005, which are incorporated by reference as if fully set forth herein.

FIELD OF INVENTION

The present invention relates generally to wireless communications. More specifically, the present invention is related to a method and system for securing such wireless communications by strategically positioning the source and/or the recipient of the communications.

BACKGROUND

As wireless connectivity becomes more pervasive and reliable, it is expected that all the digital computing, data storage and media storage devices that are in widespread use today will become part of Ad-hoc wireless communication networks. However, such networks are susceptible to data security breaches in many respects. For example, Ad-hoc networks, where individual users communicate with each other directly without using intermediary network nodes, create new susceptibilities to the users and networks.

To reduce the susceptibility of wireless networks, techniques such as wired equivalent privacy (WEP), Wi-Fi protected access (WPA), extensible authentication protocol (EAP) and GSM-based encryption have been developed. Although these techniques provide some protection, they are still susceptible to various trusts, rights, identity, privacy and security issues. For example, although a particular wireless communication node may have the correct WEP keys to communicate with a wireless user, that user may not know whether the particular node can be trusted.

Additionally, authentication of the user using these keys typically occurs at higher layers of the communication stack. Accordingly, even when these controls are in place, a rogue wireless user or hacker may have some (although limited) access to the communication stack. This access creates vulnerabilities, such as denial of service attacks, among others.

The fact that wireless signals degrade with distance introduces a natural measure of security since intercepting a signal requires one to be sufficiently close to the source to detect it. This is particularly true in small networks, where the transmit power is typically low and communications typically occur at highest rates and in an Ad-hoc fashion. In many situations, physical proximity may be the most difficult attribute for a malicious attacker to attain. In fact communication which can only be detected within a very short proximity of the transmitter may not need to be very well protected.

Accordingly, it would be desirable to implement a security system for wireless networks which can take advantage of the natural security offered by degradation of wireless signals. Furthermore, it would be desirable to ensure that any information transmitted to a user is accessible only at the location of the user, such that a "eavesdropper" located in the general proximity of the user, but not at the user's immediate location, is prevented from receiving complete messages transmitted to the user.

SUMMARY

A method for transmitting an encrypted signal to a wireless transmit/receive unit (WTRU) such that decryption of the encrypted signal depends on a trust zone associated with the WTRU is disclosed. The encryption may be performed using hierarchical modulation, scrambling, authentication, location validation, or a combination thereof. The size of a trust zone may also be adjusted.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "wireless transmit/receive unit" (WTRU) includes but is not limited to a user equipment (UE), a mobile station, a fixed or mobile subscriber unit, a pager, a station (STA) or any other type of device capable of operating in a wireless environment. When referred to hereafter, the terminology "access point" (AP) includes but is not limited to a base station, a Node-B, a site controller or any other type of interfacing device in a wireless environment.

The present invention is based on the fact that most conventional channel codes, (e.g., Turbo codes, low density parity check (LDPC) codes, or the like), are operating close to the Shannon limit in most practical scenarios. As applied to wireless communication systems, (ignoring the effect of fading), the receiver's ability to demodulate data is almost a binary function of the effective SNR at the input to the receiver's decoder.

The features of the present invention may be incorporated into an integrated circuit (IC) or be configured in a circuit comprising a multitude of interconnecting components.

Figure 1:
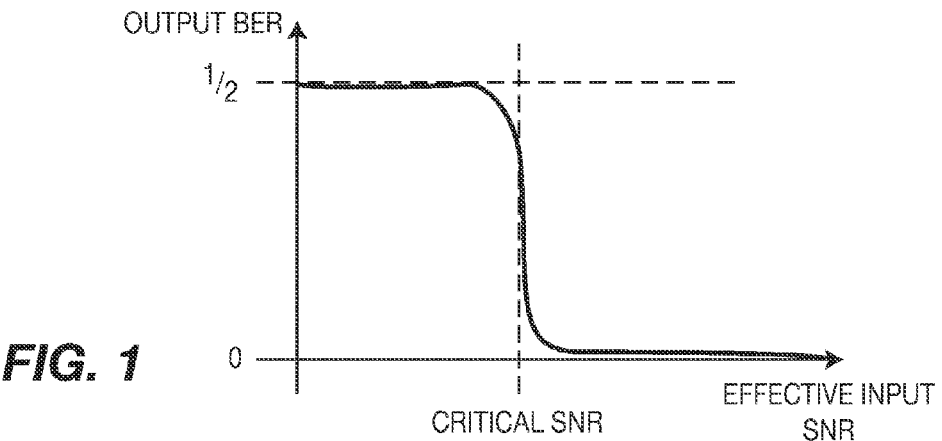
FIG. 1 is a graphical representation showing a relationship between effective input SNR of a receiver's decoder and the decoder's output BER.

FIG. 1 is a graphical representation showing a relationship between effective decoder input SNR and a decoder output BER. A critical SNR exists such that if the actual effective SNR falls below the critical SNR, the decoder fails completely, (i.e., the decoder's output BER effectively 1), and data in a wireless communication cannot be read. Conversely, if the actual effective SNR at the decoder input is above the critical SNR, the probability of error at the decoder output is extremely low and the data in the wireless communication can be read with very high probability.

Since it is assumed that the channel code approaches the Shannon limit, it can be assumed that the coding is performed at the Shannon capacity rate. Moreover, it is convenient to actually work in terms of spectral efficiency, since this makes the numeric results independent of the bandwidth. For a complex-valued additive white Gaussian noise (AWGN) channel, the Shannon capacity rate is given by:

$$R = \log_2(1+SNR); \quad \text{Equation (1)}$$

where SNR is used in the $E_b/N_o$ sense. It is assumed that for coding rates above this rate, reliable information decoding is not possible and for coding rates below this rate, reliable information decoding is essentially guaranteed. In fact, with large-block length codes, such as LDPC and Turbo codes, this is a realistic assumption.

The SNR basically depends on the distance between the transmitter and the receiver. The SNR dependency on the distance from the transmitter is given by a power law as follows:

$$SNR(d) = \frac{E}{d^\gamma}; \quad \text{Equation (2)}$$

where E is a nominal SNR at a distance of 1 unit. In free space, the exponent γ is 2, but in practical wireless networks, the exponent γ is somewhere between 3 and 4, depending on the channel topology.

Let $SNR_c$ be the critical SNR for the chosen coding scheme. Then, the distance covered with this critical SNR is determined as follows:

$$d = \sqrt[\gamma]{\frac{E}{SNR_c}}; \quad \text{Equation (3)}$$

and it can be rewritten in dBs as follows:

$$\log d = \frac{1}{\gamma}(\log E - \log SNR_c) = \frac{1}{\gamma}(E_{dB} - SNR_{cdB}). \quad \text{Equation (4)}$$

The present invention makes d a function of security policy. By dynamically choosing d, a receiver at a distance closer than d can operate with a looser security policy, while a receiver with a distance beyond d will require a stricter security policy.

In a typical communication scheme, the channel coding scheme is fixed since it is quite expensive to have "programmable" decoders for completely different coding schemes. Thus, $SNR_c$ is fixed. Then, from Equations (3) and (4), d can be controlled by controlling E and γ in a communication system. In order to achieve this goal, at least one of these controls must vary depending on extrinsic security-related information that a receiver may or may not possess.

E is defined as a nominal SNR at a unit distance. In reality, E is a transmit power per information bit intended to a particular receiver. The nominal SNR definition is necessary since the power law model of Equation (2) breaks down for small values of d and leads to infinite SNRs. Thus, controlling E means controlling the output power per information bit. For example, the control of the output power per information bit may be accomplished in any one or combination of the following processes:

1) by directly controlling the output power applied to the particular receiver's data;

2) by reducing the output SNR and hence the receiver's receive SNR by adding an additional noise like signal to the transmitted signal. This has the advantage of maintaining constant output power whilst regulating the SNR to individual receivers.

3) by controlling a modulation scheme, (e.g., selecting QPSK/M-quadrature amplitude modulation (QAM)/M-phase-shift keying (PSK)/frequency-shift keying (FSK), or the like);

4) by adjusting a bit length (e.g. for UWB systems);

5) by controlling jitter and timing of transmission;

6) by controlling an effective coding rate for the data to the receiver, which is a preferred one in the present invention. This method offers the ability, in a WLAN system, to maintain constant power level between the APs and WTRU in such a way as to maintain a uniform and regular grid spacing between the various APs in a system without affecting the performance of the CSMA system from fluctuating transmit power levels;

7) by changing the rate matching rules so as to introduce puncturing or repetition of symbols and hence the effective bit energy;

8) by controlling a modulation index; and 9) by controlling the amount of interference the receiver will experience.

The interference control can be accomplished by one or combination of the following ways, but is not limited to:

1) by applying variable interference management techniques, such as pre-equalization to the desired receiver's signal and/or the interfering receiver's signal and varying the degree to which cross-interference is removed or introduced;

2) by selective power control, (the power control could be a jointly optimized process with the security policy);

3) by time/frequency/code scheduling to control the number of potential interferers;

4) by dynamic interference control, (e.g., turned on and off); and 5) by signaling through a third party beacon which in turn transmits signals creating additional interference pattern.

Additionally, in the presence of multiple receive antennae, the value of E can be made dependent on the angular location of the receiver with respect to the transmitter (Θ), (i.e., E=E (Θ), and consequently d can be made as a function of Θ as well. This introduces another set of control possibilities, which include, but not limited to, the following ways:

1) beamforming towards or away from the receiver in azimuth, elevation or both;

2) interference management using smart antenna techniques; and 3) introduction of transmission patterns.

With respect to γ, the value of γ depends on Doppler spread of the received signal, which generally depends on the relative velocity of the receiver with respect to the transmitter and the geography of their environment. However, the transmitter can artificially increase the Doppler spread by internal signal processing. Since the value of γ depends on the geography of the environment, if the transmitter is equipped with a plurality of antennas, it can control γ to some extent by aiming the transmitted signal in an appropriate fashion.

The receiver may detect the presence of an adversary actively tampering with the wireless channel in accordance with the present invention. If the receiver is informed through auxiliary means that the receiver should be able to successfully demodulate the data stream, but is in fact unable to do so after a sufficiently large number of attempts, and since the security policy and the communication controls of the receiver are set in such a way as to enable the demodulation of the data stream, the receiver can then assume that the wireless channel is being tampered with.

The present invention preferably utilizes a code rate as a parameter depending on the security policy of the receiver. Typically, the ability of the receiver to demodulate a signal depends on geography, (the effective distance), which is more complex than a straight-line distance. If necessary, the transmitter and the receiver can discover the effective distance between them by slowly increasing, (or alternatively decreasing), one or more of the control parameters and detecting the point at which reliable data decoding becomes possible, (or alternatively is no longer possible).

Figure 2:
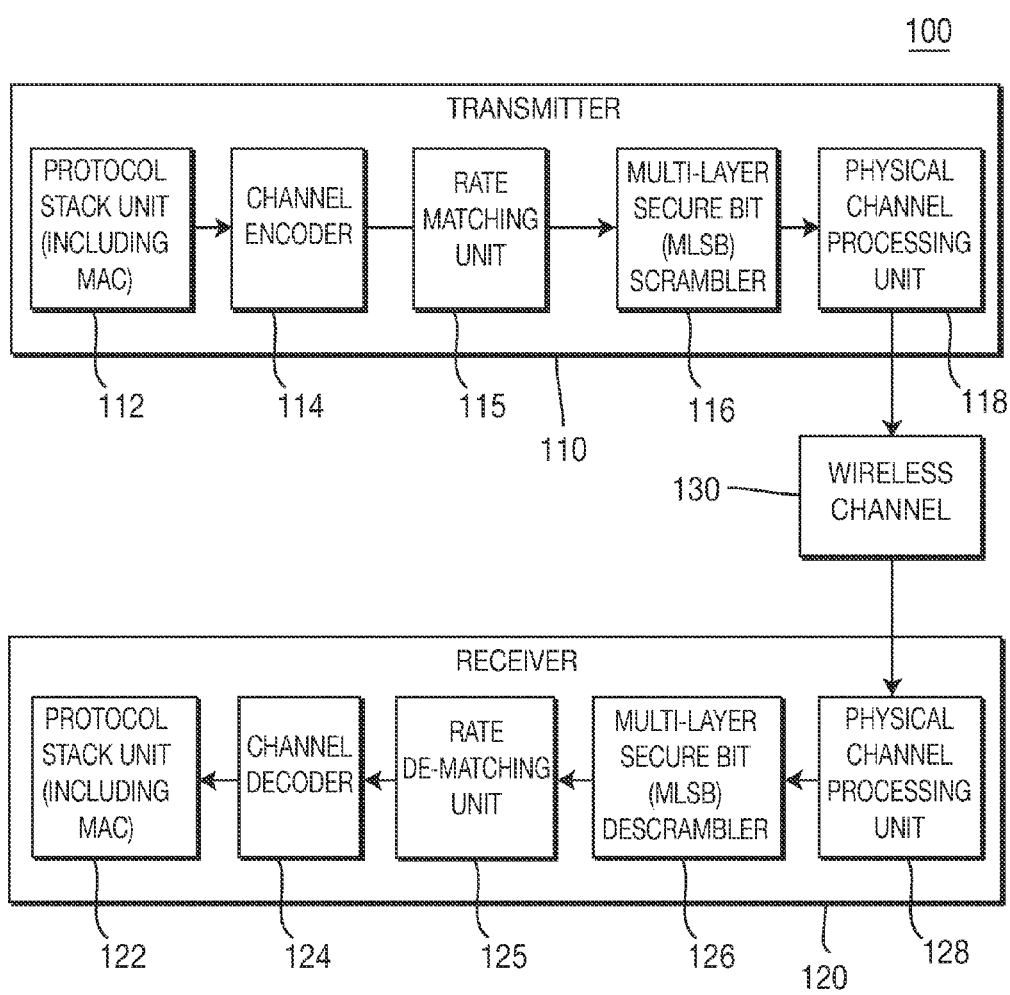
FIG. 2 is a block diagram of a wireless communication system including a transmitter and a receiver used to secure wireless communications in accordance with the present invention.
Figure 3:
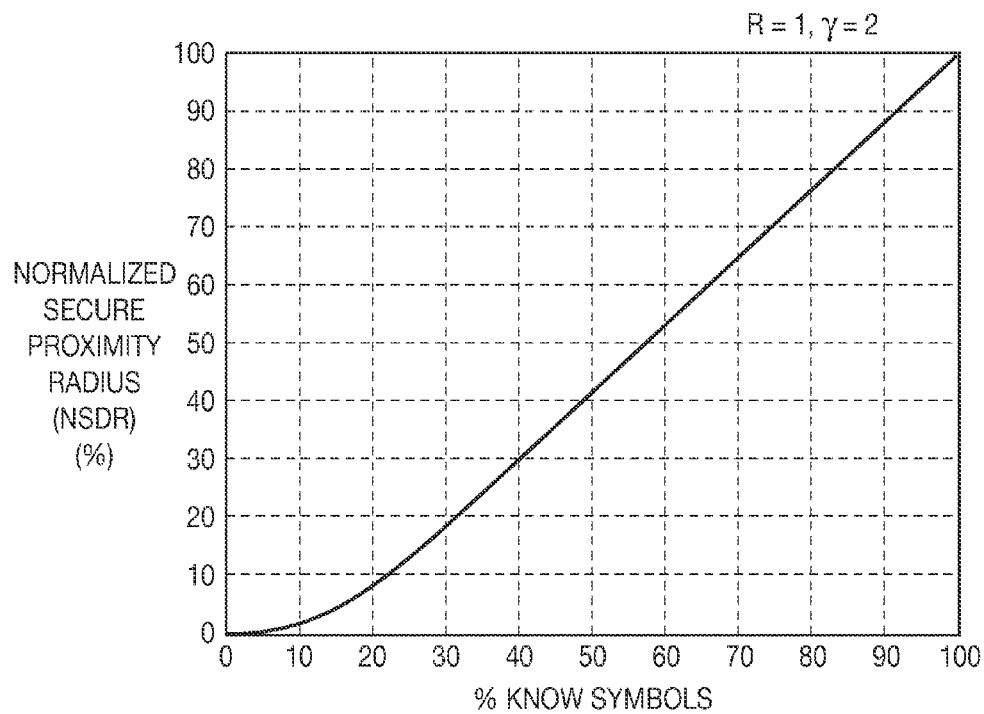
FIG. 3 is a graphical representation showing a relationship between normalized secure proximity radius (NSPR) and known symbols for R=1, $\gamma$=2.
Figure 4:
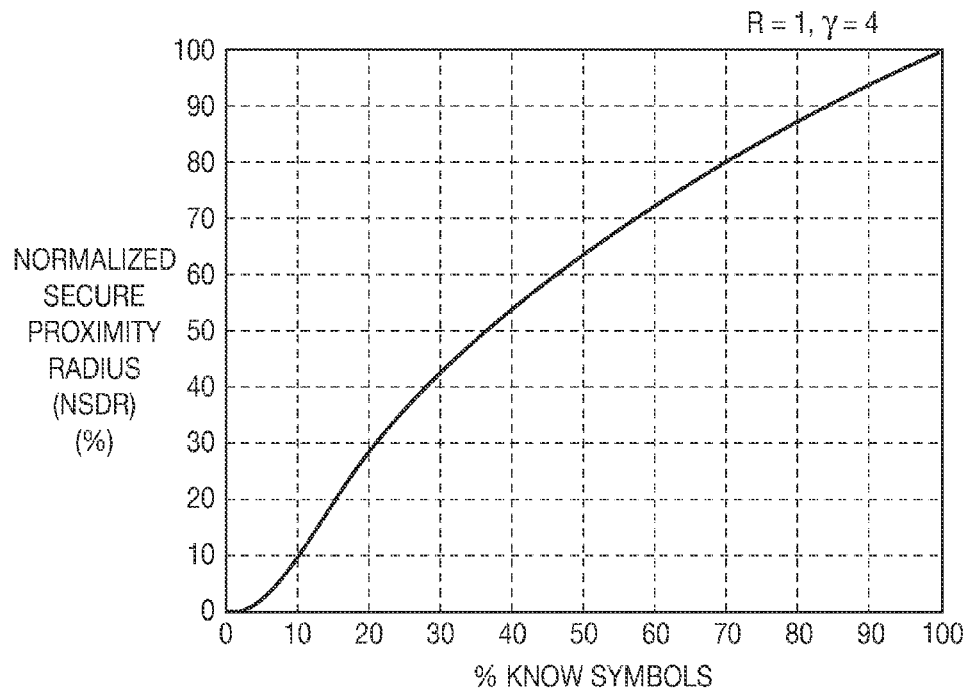
FIG. 4 is a graphical representation showing a relationship between NSPR and known symbols for, R=1, $\gamma$=4.
Figure 5:
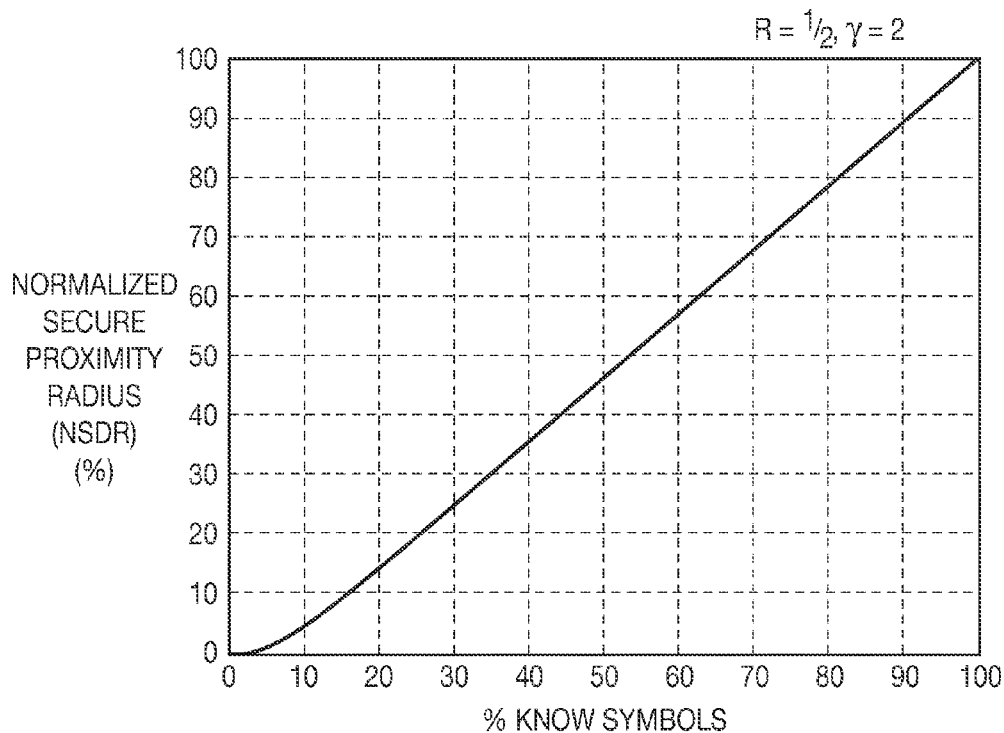
FIG. 5 is a graphical representation showing a relationship between NSPR and known symbols for R=½, $\gamma$=2.
Figure 6:
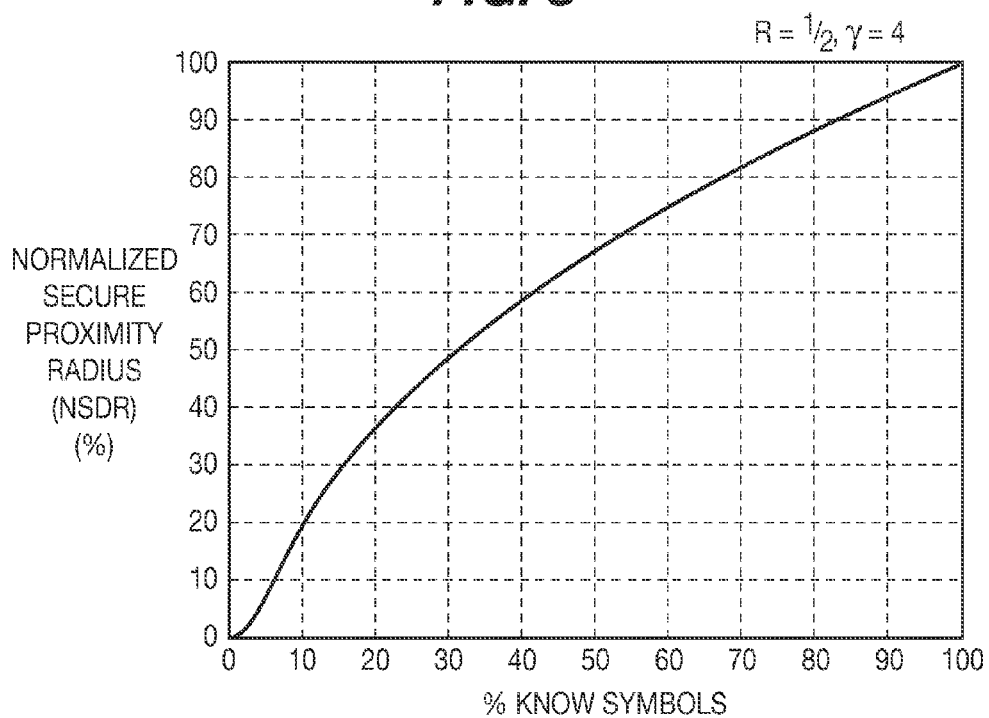
FIG. 6 is a graphical representation showing a relationship between NSPR and known symbols for and R=½, $\gamma$=4.

FIG. 2 is a block diagram of a communication system 100 including a transmitter 110 and a receiver 120 in accordance with the present invention. The transmitter 110 comprises a protocol stack unit 112, a channel encoder 114, a rate matching unit 115, a multi-layer secure bit (MLSB) scrambler 116 and a physical channel processing unit 118. The receiver 120 comprises a physical channel processing unit 128, an MLSB descrambler 126, a rate de-matching unit 125, a channel decoder 124 and a protocol stack unit 122. The protocol stack units 112, 122, the channel encoder 114, the rate matching unit 115, the rate de-matching unit 125, the channel decoder 124 and the physical channel processing units 118, 128 are essentially the same components as used in conventional transmitters and receivers. The protocol stack unit 112 generates an information stream and this information stream is encoded for error protection by the channel encoder 114, and then is further processed to be transmitted via a wireless channel 130, (i.e., a particular air interface), by the physical channel processing unit 118. This process is reversed at the receiver 120.

The channel encoder 114 maps a sequence of input data to a sequence of output channel symbols. The MLSB scrambler 116 scrambles the channel symbols. The channel symbols may be bits or higher-order modulation symbols. Not all the symbols need to be scrambled. The MLSB scrambler 116 may take a subset of symbols and scrambles them. Receivers should be aware of which symbol positions are scrambled.

Several security layers are defined in accordance with the present invention. The proportion of the scrambled symbols that a MLSB descrambler 126 can descramble depends on the security layer. For any symbol that the MLSB descrambler 126 can descramble, the MLSB descrambler 126 does so. For any symbol that the MLSB descrambler 126 cannot descramble, the MLSB descrambler 126 inserts an erasure, (i.e., a channel observation of 0), for that symbol. Any conventional channel decoder is capable of operating with erasures. Therefore, this does not present a problem to a current system.

The effect of the security system in accordance with the present invention on those receivers which are not able to descramble all symbols is an increase in the code rate and a simultaneous reduction in the effective SNR per information bit. The specific amount of code-rate increase and effective SNR reduction depends on the security level, which will be explained hereinafter.

The rate matching unit 115 in the transmitter 110 operates in accordance with rate matching rules, which may be changed so as to introduce puncturing or repetition of symbols and hence the effective bit energy. A channel with a code rate R is utilized. R can be greater than 1 bit per channel symbol and the effective rate for security layer n is given by:

$$R_n = \frac{R}{1 - \theta(1 - e_n)};$$ Equation (5)

where θ denotes the proportion of the scrambled symbols and $e_n$ is the proportion of symbols that a descrambler, (i.e., the rate de-matching unit 125 in the receiver 120), with a security layer n can descramble. In all cases, $e_n \in [0,1]$, $e_1=0$, $e_N=1$. The initial SNR per information bit, (more precisely $E_b/N_o$), is denoted by $E_0$. The effective SNR for security layer n is given by:

$$E_n = E_0(1 - \theta(1 - e_n)).$$ Equation (6)

Both the rate and the SNR are simply scaled by the proportion of non-scrambled known bits, which is given by:

$$\eta_n = 1 - \theta(1 - e_n).$$ Equation (7)

Therefore, it is sufficient to formulate the analysis exclusively in terms of this quantity. The SNR dependence on the distance from the transmitter is given by Equation (2).

In accordance with the present invention, it is determined that given a certain proportion of non-erased symbols, (i.e., symbols that the receiver is able to unscramble), the distance from the transmitter to the receiver, in order to be able to demodulate the data can be determined. Equation (2) is substituted into Equation (7) and solved for d to obtain the following equation:

$$d = \sqrt[\gamma]{\frac{E}{2^R - 1}}.$$ Equation (8)

Next, given that a percentage η of the symbols are not erased, Equations (5) and (6) are substituted into Equation (9) to obtain the following equation:

$$d(\eta) = \sqrt[\gamma]{\frac{\eta E}{2^{R/\eta} - 1}}.$$ Equation (9)

The percentage of distance achievable with a particular security level η can be expressed as a percentage of distance achievable with full security (η=1). This is the NSPR which is defined as follows:

$$\bar{d}(\eta) = \frac{d(\eta)}{d(1)} = \sqrt[\gamma]{\frac{\eta(2^R - 1)}{2^{R/\eta} - 1}}.$$ Equation (10)

The NSPR does not depend on E, although it does depend on the nominal transmission rate. As an example, FIGS. 3-6 present plots of NSPR versus percentage of known symbols for 4 different scenarios: R=1, γ=2; R=1, γ=4; R=½, γ=2; and R=½, γ=4, respectively. From the simulation results, it is observed that by revealing only 50% of the channel symbols, receivers located farther than about 60% of the "fully secure" transmission radius can be prevented from demodulating the information. Thus, if a receiver is beyond the effective distance for its security parameter, it is theoretically prohibited from decoding the data with a BER much better then 50%.

Figure 7:
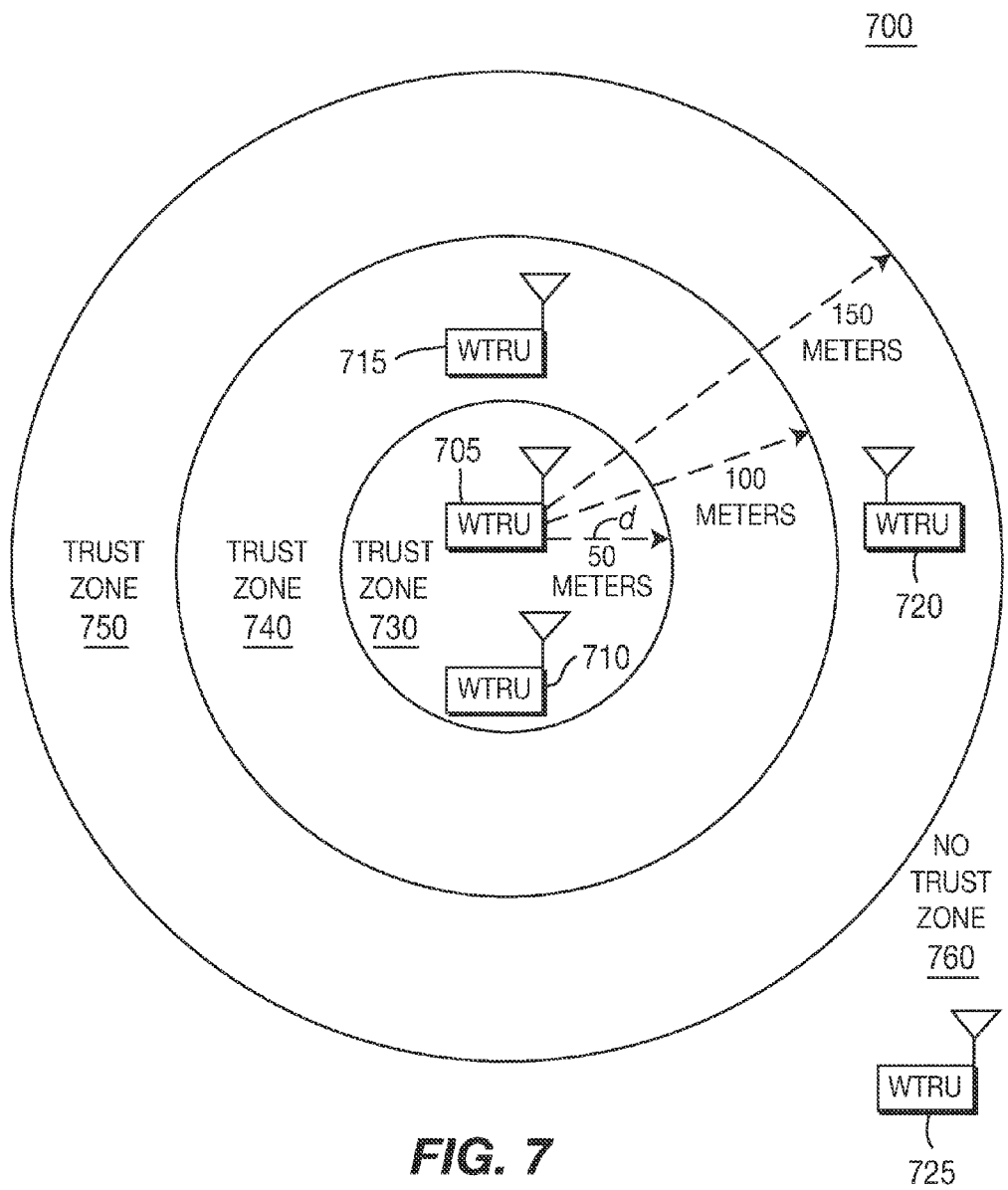
FIG. 7 is a diagram of a security network with multiple trust zones used to secure wireless communications in accordance with one embodiment of the present invention.

FIG. 7 shows a security network 700 including a plurality of WTRUs 705, 710, 715, 720 and 725 which operate in a plurality of non-overlapping trust zones 730, 740, 750 or a "no trust zone" area 760 external to the trust zones. The trust zones 730, 740, 750 and the "no trust zone" 760 are established as follows:

Transmission parameters, such as a code rate scheme, puncturing scheme, power scheme or the like, are chosen such that a receiver, (i.e., a WTRU), outside of the boundary between the trust zone 750 and the "no trust zone" 760 is not capable of decoding the transmission signal, even if the receiver is fully aware of all transmission parameters. Furthermore, a bit scrambling scheme, (to be implemented by the MLSB sub-system), is chosen such that receivers inside the trust zone 730 are able to demodulate the data, even if the receivers do not know any of the scrambled bits. The received power will be high enough such that successful demodulation can occur, even if the scrambled bits are simply taken to be punctured.

Receivers in the trust zone 740 are no longer able to demodulate the sent data unless they are aware of some of the scrambling pattern applied by the MLSB. Accordingly, receivers located in trust zone 740 will be forced to go through some kind of authentication procedure with the transmitter so that some necessary portion of the scrambling sequence is revealed to them.

Receivers in the trust zone 750 are not able to demodulate the data transmitter, even if they are aware of the portion of the scrambling sequence revealed to the receiver in the trust zone 740, (e.g., by overhearing the side communication whereby those receivers were allowed access to this sequence). Instead, they are required to request additional information about the scrambling sequence, (e.g., they may need to know the full sequence), and thus must go through a separate, (potentially more demanding), authentication process then receivers in the trust zone 740. As mentioned before, receivers in the area 760 cannot demodulate the sent data under any circumstances.

In accordance with the embodiment of the present invention described above, the distance from a transmitting WTRU 705 to a receiving WTRU is a function of security policy. By dynamically choosing the distance d, (e.g., 50 meters), a receiving WTRU 710 at a distance closer than d can operate with a looser security policy, while receiving WTRU 715, 720 and 725 with a distance beyond d will require a stricter security policy.

Figure 8:
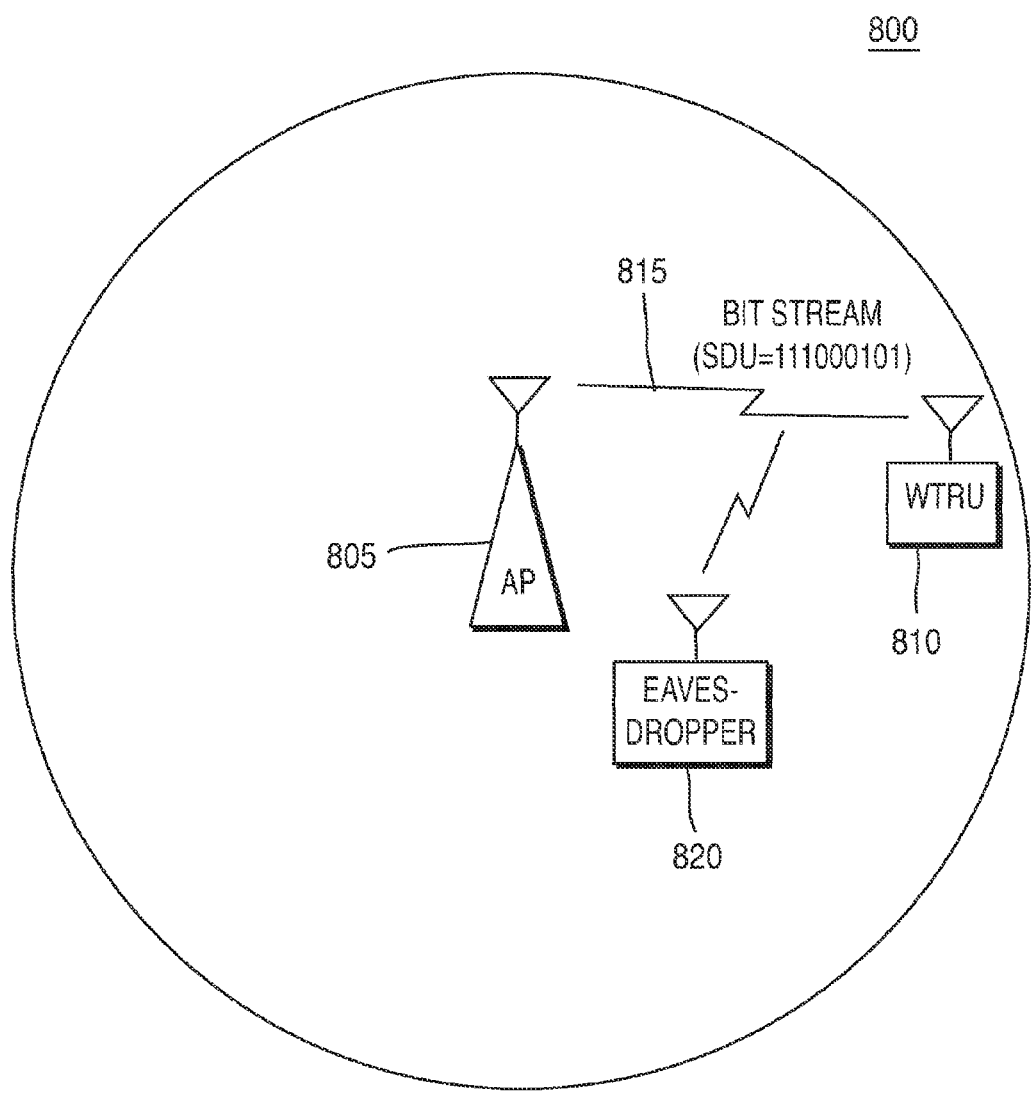
FIG. 8 is a conventional network in which an eavesdropper may intersect a bit stream transmitted from an AP to a WTRU.

FIG. 8 shows a conventional network 800 which includes an AP 805 and a WTRU 810. When the AP 805 transmits a bit stream 815 to the WTRU 810, an eavesdropper 820 within range of the AP 805 is able to receive the entire bit stream, e.g., 111000101.

Figure 9:
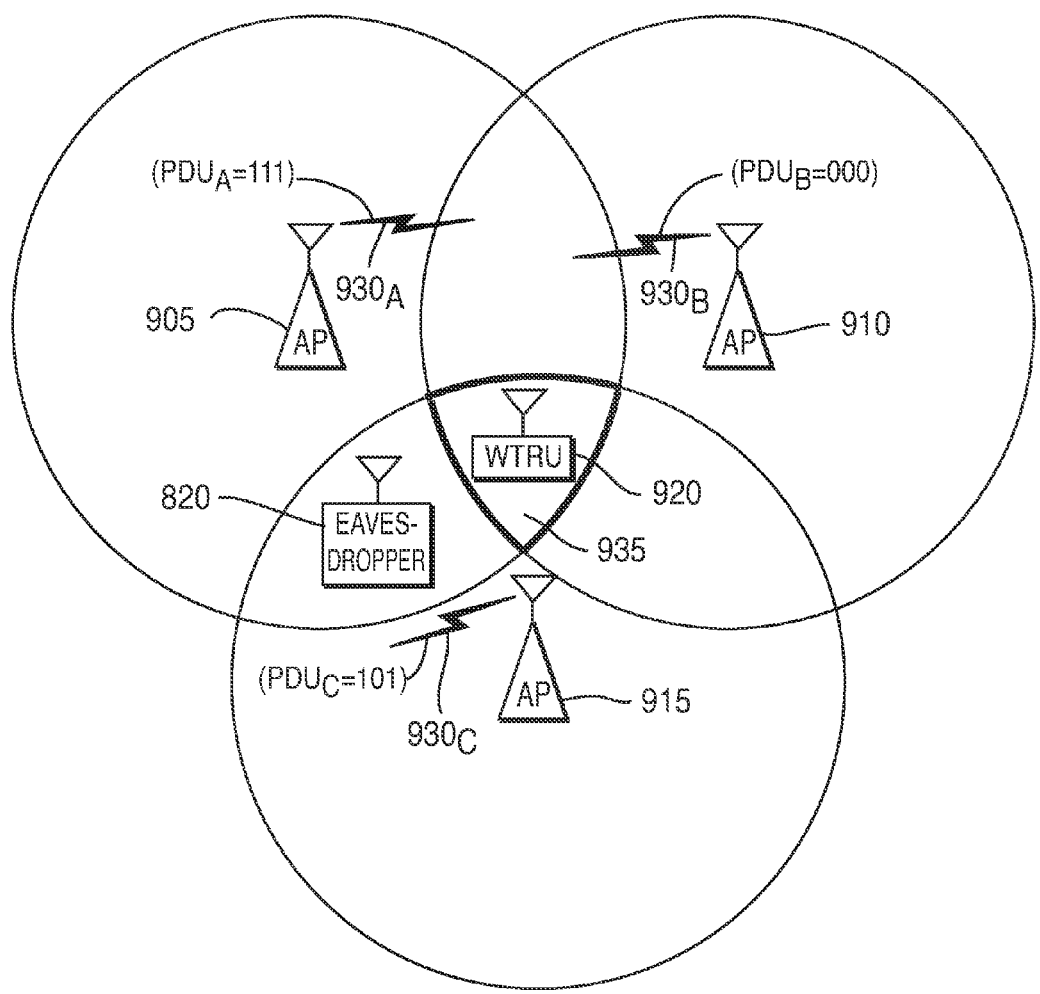
FIG. 9 is a network in which each of a plurality of APs transmits PDUs to a WTRU located in a trust zone intersected by the transmission patterns of each of the APs to secure wireless communications in accordance with another embodiment of the present invention.

FIG. 9 shows a network 900 including a plurality of access points (APs) 905, 910, 915, a WTRU 920 and the eavesdropper 820 of FIG. 8 in accordance with one embodiment of the present invention. By using a plurality of APs 905, 910, 915, rather than only the sole AP 805 in the conventional network 800 of FIG. 8, the bit stream 815 is secured from being decrypted by the eavesdropper 820. The WTRU 920 is located at the intersection 935 of the transmission patterns of the APs 905, 910 and 915, whereby the WTRU 920 will receive a first fragment $930_A$ of the bit stream 815, "111", from the AP 905, a second fragment $930_B$ of the bit stream 815, "000", from the AP 910, and a third fragment $930_C$ of the bit stream 815, "101", from the AP 915. Each fragment $930_A$, $930_B$, $930_C$ is referred to as a PDU and the original bit stream "111000101" is referred to as a service data unit (SDU). The WTRU 920 then reassembles the entire encrypted SDU from the three PDUs $930_A$, $930_B$ and $930_C$. Since the eavesdropper 820 is not physically located at the intersection 935 of the transmission patterns of the APs 905, 910 and 915 such that all of the fragments $930_A$, $930_B$, $930_C$ are received at an error rate comparable to that of the WTRU 920, the eavesdropper 820 is unable to decipher the entire bit stream 815, (even with knowledge of a secret key).

In the network 900 of FIG. 9, the SDU that is deciphered by the WTRU 920 is 111000101, where $PDU_A$=111, $PDU_B$=000 and $PDU_C$=101. If the eavesdropper 820 manages to decipher two out of the three PDUs, (e.g., 000 and 101), the eavesdropper 820 will have managed to obtain some information which is incomplete but correct.

In an alternative embodiment, any PDUs that the eavesdropper 820 does receive are rendered meaningless if incomplete. For example, the SDU that needs to be sent to the WTRU 920 in the network 900 is 111000101. However, three PDUs that are sent by three different APs 905, 910 and 915, (e.g., PDU1, PDU2, PDU3), are not fragments, as illustrated by FIG. 9, but are instead selected such that the SDU=PDU1 XOR PDU2 XOR PDU3 where PDU1=100110011, PDU 2=110000111 and PDU 3=101110001, such that the SDU=100110011 XOR 110000111 XOR 101110001=111000101, where XOR is an exclusive-or function. Thus, assuming that the WTRU 920 is located at the intersection 935 of the transmission patterns of the APs 905, 910 and 915, the WTRU 935 is able to receive all three PDUs and XOR the PDUs together to decipher the SDU 111000101. If the eavesdropper 820 captures even two of these three PDUs, they are completely meaningless with respect to deciphering the SDU. Alternative mechanisms other than XOR are also possible such as scrambling the packet and sending different bits from different transmitters in such a manner as to render meaningless the transmissions, unless all transmissions are received successfully.

In another embodiment, a location-based authentication mechanism may be incorporated in the network 900 of FIG. 9. The WTRU 920 receives transmissions from the APs 905, 910 and 915, and reports its location to each of the APs 905, 910 and 915. Based upon the reported locations of the WTRU 920 and the APs 905, 910 and 915, each of the APs 905, 910 and 915 may launch a protocol which transmits a sequence of messages, requesting a positive acknowledgement (ACK) or a negative acknowledgement (NACK) from the WTRU 920, at varying effective coding rates higher and lower than the coding rate suggested by the nominal distance between each respective AP 905, 910, 915 and the WTRU 920. Thus, the protocol establishes a criteria which dictates, based on location of the WTRU 920 with respect to the locations of the APs 905, 910 and 915, whether the WTRU may decode transmissions received from the APs 905, 910 and 915. If the location reported by the WTRU 920 is determined to be correct, the protocol will then verify the authenticity of the location of the WTRU 920 by processing ACK/NACK messages received from the WTRU 920 in response to the sequence of messages.

Verification of the authenticity of the WTRU 920 may also be performed such that the WTRU 920, (or a user of the WTRU 920), and the APs 905, 910 and 915 share a common secret. For example, if APs 905, 910 and 915 require the location indicated by the WTRU 920 to be authenticated, the APs 905, 910 and 915 send a "challenge question" via a plurality of PDUs, which may be fragmented or encrypted as described above, such that the "challenge question" would be decipherable by the WTRU 920 only if the WTRU 920 is located as indicated. Thus, the WTRU 920 would not be able to "answer" the "challenge question" unless it was located at a position where the "challenge question" could be deciphered.

Figure 10:
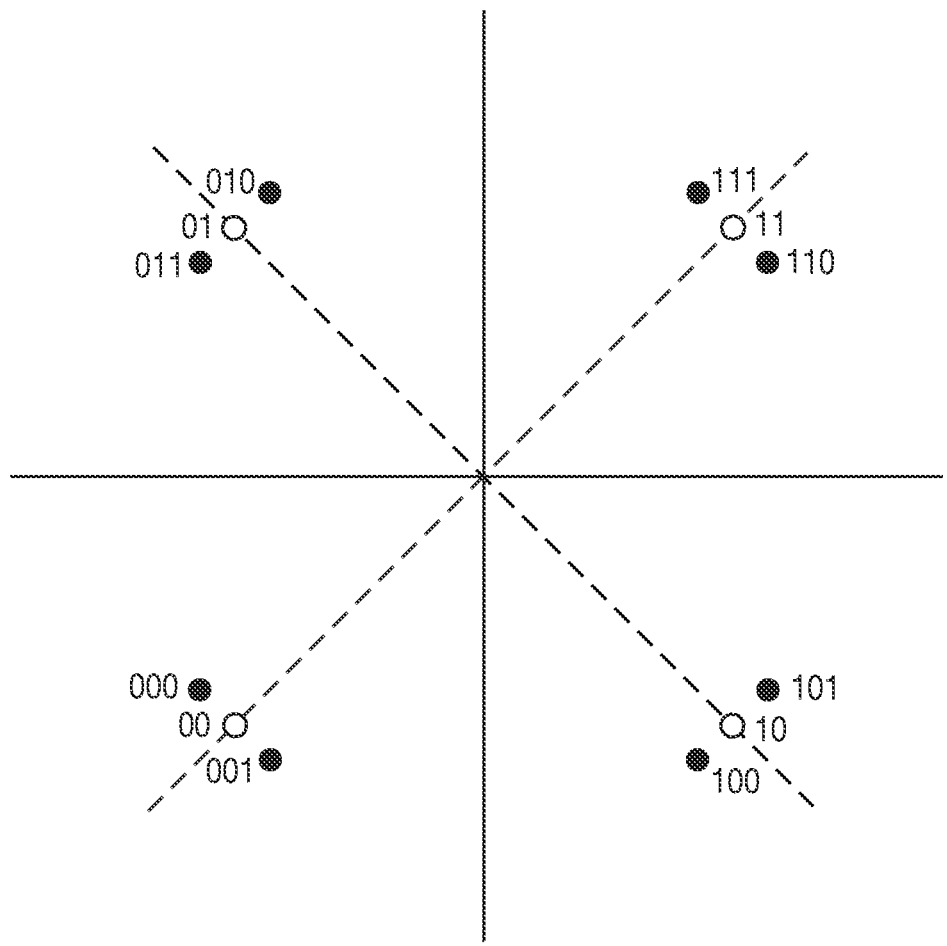
FIG. 10 shows a QPSK modulation constellation which illustrates how wireless communications are secured in accordance with yet another embodiment of the present invention.

FIG. 10 shows an example of a hierarchical modulation (HM) scheme, defined by a combination of primary and secondary modulation schemes, which, in this case, are QPSK and BPSK respectively. It is well known that a QPSK modulation scheme is defined by 4 modulation points, which together constitute the QPSK modulation constellation. The modulation points represent carrier phases of $\pi/2$, $3\pi/2$, $-\pi/2$ and $-3\pi/2$ and denote two bits 00, 01, 10 and 11 respectively. Similarly, it is well known that a BPSK modulation scheme is defined by 2 modulation points, which together constitute the BPSK modulation constellation. The modulation points represent carrier phases of $+\delta$ and $-\delta$ radians, and denote one bit 0 or 1 respectively. In turn, the HM scheme is defined by 8 modulation points, constructed from the primary and secondary modulation constellations.

The HM modulation points represent carrier phases of $(\pi/2-\delta)$, $(\pi/2+\delta)$, $(3\pi/2-\delta)$, $(3\pi/2+\delta)$, $(-\pi/2-\delta)$, $(-\pi/2+\delta)$, $(-3\pi/2-\delta)$, $(-3\pi/2+\delta)$ and denote three bits 000, 001, 010, 011, 100, 101, 110 and 111 respectively. These 8 modulation points constitute four (4) clusters, each including two (2) closely spaced modulation points. For example, the modulation represented by the carrier phases $(\pi/2-\delta)$, $(\pi/2+\delta)$ would constitute a cluster. The transmitter sends a sequence of symbols taken from the HM constellation over a wireless channel, which attenuates and contaminates the signal as it travels farther from the transmitter. A receiver which is close to the transmitter will, in general, receive a signal with good signal strength and signal quality, so that it can detect the carrier phase and hence the 3 bits accurately. However, a receiver which is far from the transmitter will, in general, receive a signal with lower signal strength and signal quality, so that it may not be able to discriminate between the closely spaced modulation points in each cluster, although it can determine which cluster the transmitted symbols belongs to. Thus, such a receiver can detect the primary modulation but not the secondary modulation. Accordingly, the receiver can detect two bits of data but not the third bit.

This embodiment of the present invention may be used for implementing a security or trust zone. The data associated with the primary modulation points, that is the first 2 bits, is encoded or encrypted or scrambled with a secret key and the secret key itself is transmitted via the $3^{rd}$ bit of a sequence of symbols. Thus, a receiver within the trust zone can detect the key and use it to decode or decrypt or descramble the primary data. A receiver outside of the trust zone can detect the primary data but not the secret key, and thus cannot decode or decrypt or descramble the primary data. Any modulation scheme may be used for the primary and the secondary modulation schemes of the present invention. Examples include M-ary PSK, M-ary FSK, M-ary QAM, or the like. Furthermore, only selected modulation points in the primary modulation constellation may be superimposed with secondary clusters. Finally, more than two levels of hierarchy may be imposed. For example, QPSK on BPSK on BPSK represents a three-level HM.

In another embodiment, a layered HM scheme may be implemented. FIG. 10 shows a simple two-level scheme where the main waveform is a QPSK signal overlaid with a biphase shift keying (BPSK) HM. When a receiver's SNR is high, it is possible to distinguish all constellation points. As the SNR decreases, it becomes difficult to distinguish the points of the BPSK hierarchy from the nominal QPSK constellation points and hence the HM data is lost.

In accordance with the present invention, scrambled data is modulated in the main waveform and descrambling information is encoded in the HM. When the receiver is located within a zone where the HM is discernable, the descrambling information enables successful reception. When the receiver is too far away and hence unable to extract the HM data, the descrambling information has to be explicitly requested through other channels. By varying the power allocated to the HM waveform, the range can be zone controlled.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in secure wireless communication, the method comprising:
generating an encrypted signal by modulating a message using a hierarchical modulation point selected from a hierarchical modulation constellation; and
transmitting, by a transmitter, the encrypted signal to a wireless transmit/receive unit (WTRU) that is associated with a zone, wherein:
a plurality of trust zones are defined and the signal is encrypted in a way that the encrypted signal can be decrypted by the WTRU with a different level of information depending on a trust zone with which the WTRU is associated;
a no trust zone is defined and the signal is encrypted in a way that the encrypted signal cannot be decrypted by the WTRU on a condition that the WTRU is associated with the no trust zone;
the generating the encrypted signal includes:
encrypting the message using an encryption code;
modulating the encrypted message using a first modulation level of the hierarchical modulation point; and
modulating the encryption code using a second modulation level of the hierarchical modulation point; and
the second modulation level cannot be detected in the no trust zone.

2. The method of claim 1, wherein the zones are geographic zones.

3. The method of claim 1, wherein the transmitting the encrypted signal includes scrambling a symbol in the message using a scrambling sequence.

4. The method of claim 3, wherein the encrypted signal can be decrypted includes providing a portion of the scrambling sequence to the WTRU.

5. The method of claim 4, wherein a first trust zone includes a second trust zone and a third trust zone and the providing a portion of the scrambling sequence includes:
providing a first portion of the scrambling sequence to the WTRU on a condition that the WTRU is associated with the second trust zone; and providing a second portion of the scrambling sequence to the WTRU on a condition that the WTRU is associated with the third trust zone.

6. The method of claim 3, further comprising:
authenticating the WTRU; and
determining the trust zone that the WTRU is associated with in order to provide the WTRU with the level of information for decrypting the encrypted signal.

7. The method of claim 6, wherein a first trust zone includes a second trust zone and a third trust zone and the authenticating the WTRU includes:
authenticating the WTRU using a first authentication method on a condition that the WTRU is associated with the second trust zone; and
authenticating the WTRU using a second authentication method on a condition that the WTRU is associated with the third trust zone.

8. The method of claim 1, further comprising:
adjusting a size of a trust zone by adjusting a transmission parameter.

9. The method of claim 8, wherein the transmission parameter is a code rate scheme, a puncturing scheme, or a power scheme.

10. The method of claim 1, further comprising:
validating a location of the WTRU.

11. The method of claim 10, wherein the validating a location of the WTRU includes:
transmitting a first location verification message to the WTRU; and
receiving a first response from the WTRU, wherein the first response indicates whether the WTRU decoded the first location verification message.

12. The method of claim 11, wherein the validating a location of the WTRU includes:
adjusting the transmission parameter;
transmitting a second location verification message to the WTRU; and
receiving a second response from the WTRU, wherein the second response indicates whether the WTRU decoded the second location verification message.

13. The method of claim 1, wherein the transmitting the encrypted signal includes transmitting a first part of a message.

14. The method of claim 13, wherein the transmitting a first part of a message includes selecting the first part of the message such that the message may be recovered by concatenating the first part of the message with a second part of the message.

15. The method of claim 13, wherein the transmitting a first part of a message includes scrambling the message and selecting the first part of the scrambled message such that the message may be recovered by concatenating the first part of the message with a second part of the message and descrambling the concatenated first and second parts of the message.

16. The method of claim 13, wherein the transmitting a first part of a message includes selecting the first part of the message such that the message may be recovered by applying an exclusive-or function to the first part of the message and a second part of the message.

17. A base station comprising:
a processor configured to generate an encrypted signal by modulating a message using a hierarchical modulation point selected from a hierarchical modulation constellation; and
a transmitter to transmit the encrypted signal to a wireless transmit/receive unit (WTRU) that is associated with a zone, wherein:
a plurality of trust zones are defined and the signal is encrypted in a way that the encrypted signal can be decrypted by the WTRU with a different level of information depending on a trust zone with which the WTRU is associated;
a no trust zone is defined and the signal is encrypted in a way that the encrypted signal cannot be decrypted by the WTRU on a condition that the WTRU is associated with the no trust zone;
to generate the encrypted signal includes:
encrypting the message using an encryption code;
modulating the encrypted message using a first modulation level of the hierarchical modulation point; and
modulating the encryption code using a second modulation level of the hierarchical modulation point; and
the second modulation level cannot be detected in the no trust zone.

18. The base station of claim 17, wherein the zones are geographic zones.

19. The base station of claim 17, wherein to transmit the encrypted signal includes scrambling a symbol in the message using a scrambling sequence.

20. The base station of claim 19, wherein the encrypted signal can be decrypted includes providing a portion of the scrambling sequence to the WTRU.

* * * * *